US012807420B2

(12) United States Patent
Huang et al.

(10) Patent No.: US 12,807,420 B2
(45) Date of Patent: Nov. 24, 2026

(54) BUMP-LESS TRANSITION BETWEEN TRAJECTORY CHANGES

(71) Applicant: Rockwell Automation Technologies, Inc., Mayfield Heights, OH (US)

(72) Inventors: Yuhong Huang, Acton, MA (US); Pablo M. Vasquez Trujillo, Devens, MA (US); Robert J. Miklosovic, Chardon, OH (US); Maulik R. Kalolia, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 367 days.

(21) Appl. No.: 18/425,126

(22) Filed: Jan. 29, 2024

(65) Prior Publication Data

US 2025/0243007 A1 Jul. 31, 2025

(51) Int. Cl.
*B65G 35/06* (2006.01)
*B65G 43/00* (2006.01)

(52) U.S. Cl.
CPC ............. *B65G 35/06* (2013.01); *B65G 43/00* (2013.01)

(58) Field of Classification Search
CPC ........ B65G 35/06; B65G 54/02; B65G 43/00; B60L 13/03; B60L 15/005
USPC .......... 198/619; 700/95, 112, 113, 213, 228, 700/229, 230
See application file for complete search history.

(56) References Cited

U.S. PATENT DOCUMENTS

| | | | | |
|---|---|---|---|---|
| 6,191,507 | B1 * | 2/2001 | Peltier | B65G 54/02 318/135 |
| 10,261,491 | B1 | 4/2019 | Dunham et al. | |
| 10,432,117 | B1 * | 10/2019 | Huang | H02P 7/025 |
| 10,442,637 | B2 * | 10/2019 | Huang | B65G 43/00 |
| 11,829,158 | B2 | 11/2023 | Huang et al. | |

* cited by examiner

*Primary Examiner* — William R Harp
(74) *Attorney, Agent, or Firm* — Boyle Fredrickson, S.C.

(57) ABSTRACT

A system and method of transitioning between motion trajectories in an independent cart system includes controlling motion of a mover along a track segment with a segment controller responsive to a first motion trajectory. At least one operating state for the first motion trajectory is received at an external controller as the segment controller is controlling motion of the mover responsive to the first motion trajectory. A second motion trajectory for the mover is generated with the external controller, where the second motion trajectory includes the at least one operating state as an initial condition for the second motion trajectory. While the segment controller is controlling motion of the mover along the track segment responsive to the first motion trajectory, the second motion trajectory is transmitted from the external controller to the segment controller, and the segment controller switches from the first motion trajectory to the second motion trajectory.

19 Claims, 6 Drawing Sheets

BUMP-LESS TRANSITION BETWEEN TRAJECTORY CHANGES

BACKGROUND INFORMATION

The subject matter disclosed herein relates to motion control for an independent cart system. More specifically, an improved system and method for transitioning between motion commands generated by different controllers for a single vehicle is disclosed.

Motion control systems utilizing independent cart technology employ a linear drive system embedded within a track and multiple vehicles, also referred to as “movers” or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers. Each of the movers may be independently moved and positioned along the track in response to the electromagnetic fields generated by the coils.

As is known to those skilled in the art, there are two methods commonly used to control vehicles in an independent cart system. A first method for controlling the vehicles includes a central controller to control each of the vehicles. The central controller may be executing a control program which determines where each vehicle is required along the track, or the central controller may receive a command indicating where each vehicle is required. The central controller generates motion commands for each vehicle and receives feedback signals corresponding to a present location for each vehicle. The central controller maintains responsibility for each vehicle in the independent cart system arriving at its desired location at the required time.

In contrast, a second method for controlling vehicles in the independent cart system distributes responsibility for controlling motion of the vehicles between multiple controllers. In one such distributed control system, the track for the independent cart system is made up of multiple track segments, and each track segment includes a separate controller. A controller for one of the track segments on which a vehicle is located receives a command for the vehicle to travel to a different location within the independent cart system. The controller in the track segment on which the vehicle is located is responsible to initiate motion of the vehicle. As the vehicle transitions from one track segment to the next, data is passed between controllers in adjacent track segments to continue driving the vehicle to the desired location. When the vehicle arrives at its destination, the controller in the final track segment is responsible to bring the vehicle to a stop at its desired location. Responsibility for each vehicle is passed from one controller to the next as the vehicle travels along the track.

As is further known to those skilled in the art, the two methods each have benefits and drawbacks. A central controller allows for a single point of interaction with a technician or with another controller to obtain the current status of each vehicle in the system. A central controller is also well suited to coordinate motion of each vehicle with one or more of the other vehicles as may be required in an application. The central controller may also be used to control external devices adjacent to the independent cart system and may coordinate motion of the vehicles with motion of the adjacent devices. The central controller, however, is limited in the size of the independent cart system it may control. As the size and complexity of an independent cart system increases, communication between track segments, computational requirements for each vehicle in the system, and other such operational requirements limit the size of an independent cart system under central control.

In contrast, a distributed control system allows for near, limitless expansion of a physical system. Additional track segments and their respective controllers are responsible for controlling each vehicle present on the track segment. The computational requirements for each track segment remain relatively constant as the size of the independent cart system scales up. A central controller is only required to maintain a current record of the location of vehicles in the system and is not required to control operation of each of the vehicles. However, a distributed control system faces challenges with coordination of motion between vehicles or with coordination of motion between a vehicle and an external device adjacent to the track. Each controller in a track segment does not readily have access to information regarding the other vehicles in the system or regarding the devices executing adjacent to the tracks segment.

As a result, it may be desirable to selectively operate an independent cart system under a centralized controller for a first portion of operating conditions and under a distributed control system for other operating conditions. Transitioning between two different control methods, however, has significant challenges. Under a central control structure, the central controller is responsible for generating motion commands for each vehicle and ensuring that each vehicle arrives at its desired location. Under a distributed control structure, the controllers present in each track segment are responsible for generating motion commands for each vehicle and ensuring each vehicle arrives at its desired location. Motion commands are typically generated by complex algorithms as a function of multiple variables, such as a position and/or velocity command, a position and/or velocity feedback signal, desired acceleration and/or jerk rates, maximum current limits, and the like. The controller responsible for generating the motion command executes on a periodic schedule, receiving feedback signals from a prior cycle and generating command signals for a current cycle based on the feedback and/or command signals from one or more prior cycles. In addition, there are numerous methods of generating a motion profile, such as step changes, ramped changes, or curved changes, where many different options exist for generating curved motion profiles.

If an application requires a transition between a centralized controller and a distributed control structure, it is desirable to have a smooth operation of the controlled vehicle during a transition between controllers. A sudden change in controllers generating a motion command typically results in step change between motion commands which results in sudden changes in performance of the mover or vibration as the new controller assumes control of the mover. Because each controller typically relies on data from prior cycles, the new controller has no historical data and must initially build this historical data as it begins controlling operation of the vehicle. Each controller may also utilize a different motion profile generation method. As a result, a transition between two controllers will result in an abrupt change in the command generated for the next cycle.

Because of the complex nature of motion profile generation and because of the desire for smooth operation of a vehicle during a transition between controllers, historically vehicles are brought to a stop in order to transition between controllers. Additionally, the vehicles must be brought to a stop twice along the track. A first stop occurs when transitioning from the first control method to the second control method, and a second stop occurs when transitioning from the second control method back to the first control method. However, each time the vehicles are brought to a stop in order to transition between controllers reduces throughput in the independent cart system.

Thus, it would be desirable to provide an improved method and system for managing smooth operation of a vehicle while transitioning between controllers generating motion commands for the vehicle as the vehicle travels along a track for the independent cart system.

BRIEF DESCRIPTION

According to one embodiment of the invention, a method of transitioning between motion trajectories in an independent cart system, where the independent cart system includes a track having multiple track segments, includes receiving a first motion trajectory from a first controller at a controller for a track segment and controlling motion of the mover along the track segment with the controller responsive to receiving the first motion trajectory. The first motion trajectory defines a first desired operation of a mover in the independent cart system. At least one operating state for the first motion trajectory is transmitted to an external controller as the controller is controlling motion of the mover responsive to the first motion trajectory. While the controller is controlling motion of the mover along the track segment responsive to the first motion trajectory, a second motion trajectory is received from the external controller at the controller for the track segment. The second motion trajectory defines a second desired operation of the mover and the second motion trajectory includes the at least one operating state as an initial condition for the second motion trajectory. The controller for the track segment switches from the first motion trajectory to the second motion trajectory to control motion of the mover along the track segment as the mover continues to travel along the track segment.

According to another embodiment of the invention, a method of transitioning between motion trajectories in an independent cart system includes controlling motion of a mover along a track segment with a segment controller for the track segment responsive to a first motion trajectory and receiving at least one operating state for the first motion trajectory at an external controller as the segment controller is controlling motion of the mover responsive to the first motion trajectory. A second motion trajectory for the mover is generated with the external controller. The second motion trajectory includes the at least one operating state as an initial condition for the second motion trajectory. The second motion trajectory is transmitted from the external controller to the segment controller while the segment controller is controlling motion of the mover along the track segment responsive to the first motion trajectory. While controlling motion of the mover along the track segment, the segment controller switches from the first motion trajectory to the second motion trajectory as the mover continues to travel along the track segment.

According to still another embodiment of the invention, a system for transitioning between motion trajectories in an independent cart system includes a track for the independent cart system, multiple movers, and a controller. The track includes multiple track segments, a segment controller in each track segment, and multiple coils spaced along a length of each track segment. The coils are controlled by the segment controller to sequentially generate an electromagnetic field along the length of the corresponding track segment. Each of the movers includes at least one drive magnet operative to generate a magnetic field to interact with the electromagnetic field generated by the coils to move each of the plurality of movers along a corresponding track segment. The controller is operative to generate a desired motion trajectory defining a desired operation of a first mover, selected from the movers. A first segment controller, selected from the segment controllers for each of the track segments and corresponding to a track segment on which the first mover is located, initially controls motion of the first mover responsive to a first motion trajectory. The first segment controller transmits at least one operating state for the first motion trajectory to the controller as the first segment controller controls motion of the first mover responsive to the first motion trajectory. The controller includes the at least one operating state as an initial condition in the desired motion trajectory, and the first segment controller receives the desired motion trajectory while controlling motion of the first mover responsive to the first motion trajectory. The first segment controller switches from the first motion trajectory to the desired motion trajectory to control motion of the first mover as the first mover travels along the track segment.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
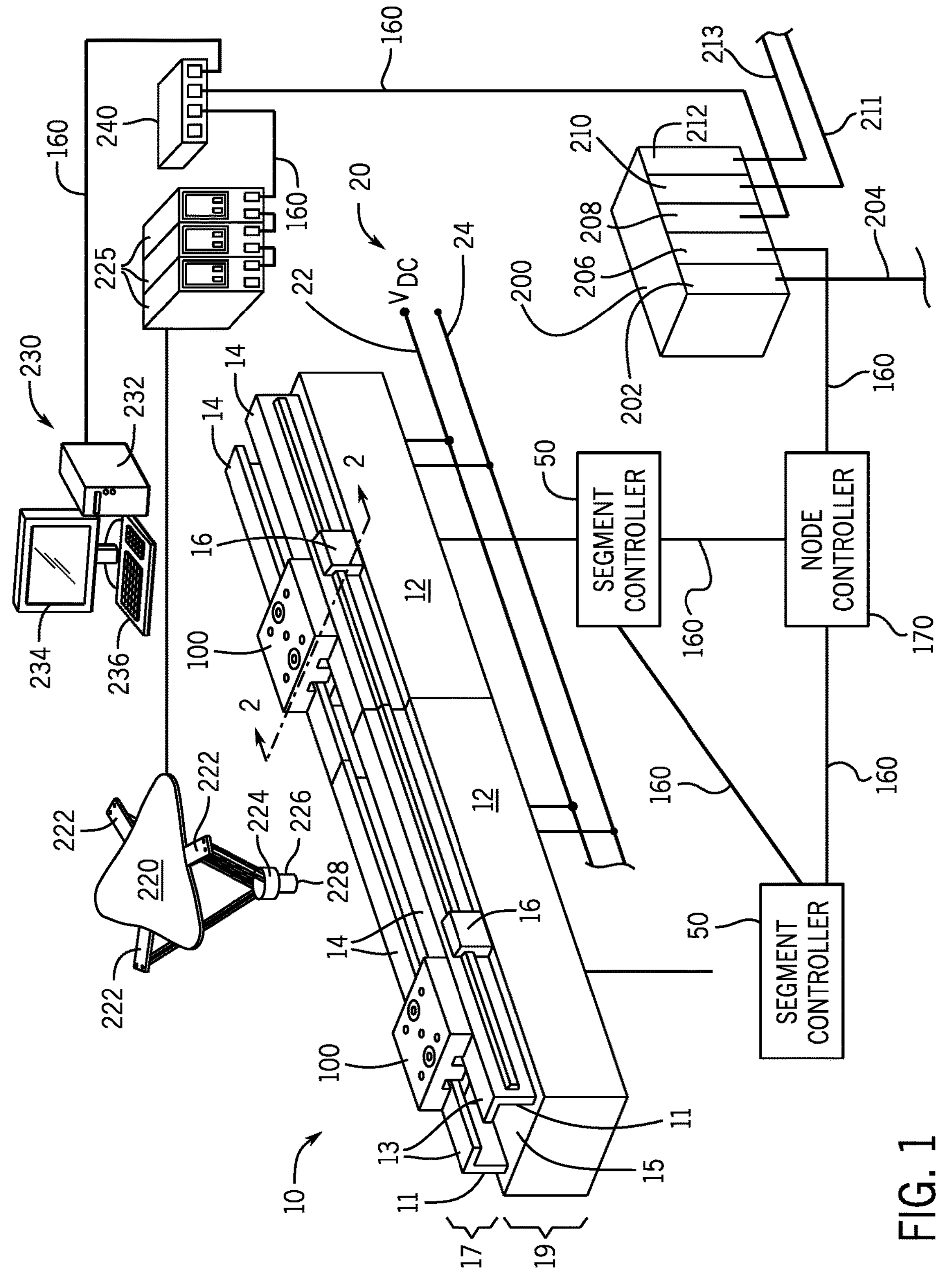
FIG. 1 is a is a schematic representation of an exemplary control system for an independent cart system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved method and system for managing smooth operation of a vehicle while transitioning between controllers generating motion commands for the vehicle as the vehicle travels along a track for the independent cart system. As a vehicle is being controlled by a first controller, the controller maintains a record of the present operating conditions over a desired period of time. When it is desired to switch between controllers, the first controller passes the record of the operating conditions for the vehicle to a second controller. The second controller uses the record of the operating conditions for the vehicle as initial conditions in a new motion command. The second controller additionally blends the motion command from the first controller into a new motion command generated by the second controller. In this manner, a vehicle may be selectively controlled by two different motion control generators, and a transition between the two different motion control generators may occur while the vehicle is moving and while maintain smooth operation of the vehicle.

Turning initially to FIG. 1, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, right-hand switches, left-hand switches, and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

Each track segment 12 includes an upper portion 17 and a lower portion 19. The upper portion 17 is configured to carry the movers 100 and the lower portion 19 is configured to house the control elements. As illustrated, the upper portion 17 includes a pair of rails 14 extending longitudinally along the upper portion 17 of each track segment 12 and defining a channel 15 between the two rails. Clamps 16 affix to the sides of the rails 14 and secure the rails 14 to the lower portion 19 of the track segment 12. Each rail 14 is generally L-shaped with a side segment 11 extending in a generally orthogonal direction upward from the lower portion 19 of the track segment 12, and a top segment 13 extending inward toward the opposite rail 14. The top segment 13 extends generally parallel to the lower portion 19 of the track segment 12 and generally orthogonal to the side segment 11 of the rail 14. Each top segment 13 extends toward the opposite rail 14 for only a portion of the distance between rails 14, leaving a gap between the two rails 14. The gap and the channel 15 between rails 14 define a guideway along which the movers 100 travel.

According to one embodiment, the surfaces of the rails 14 and of the channel 15 are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

Figure 2:
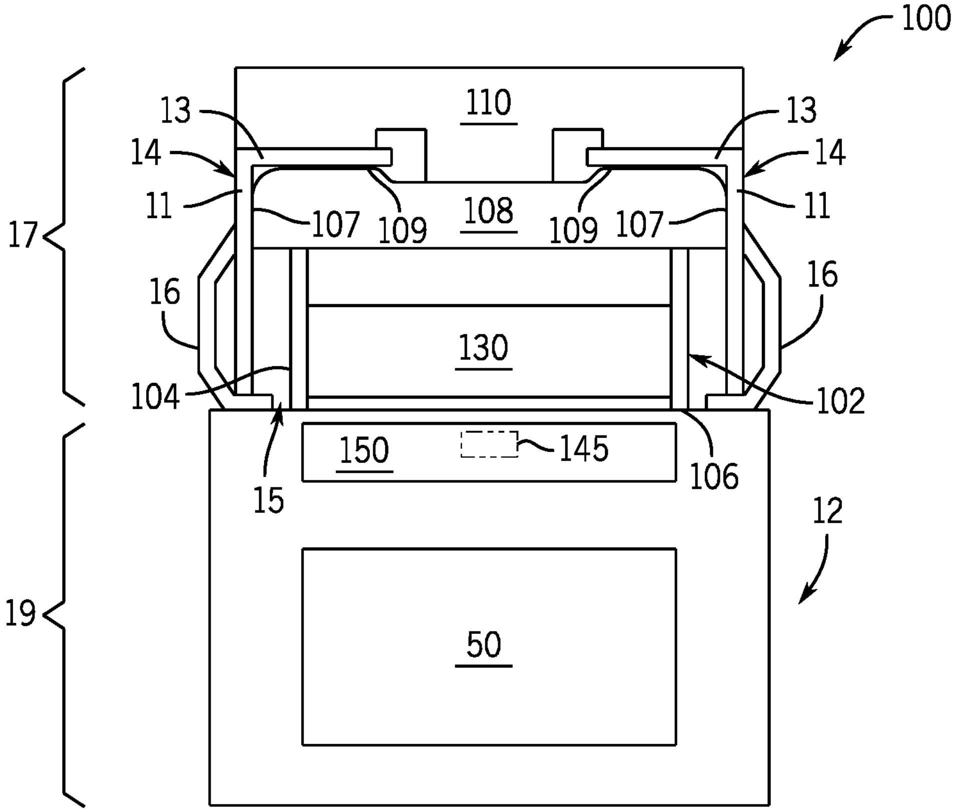
FIG. 2 is a sectional view of one embodiment of a mover and track segment included in the linear drive system taken at 2-2 of FIG. 1.
Figure 3:
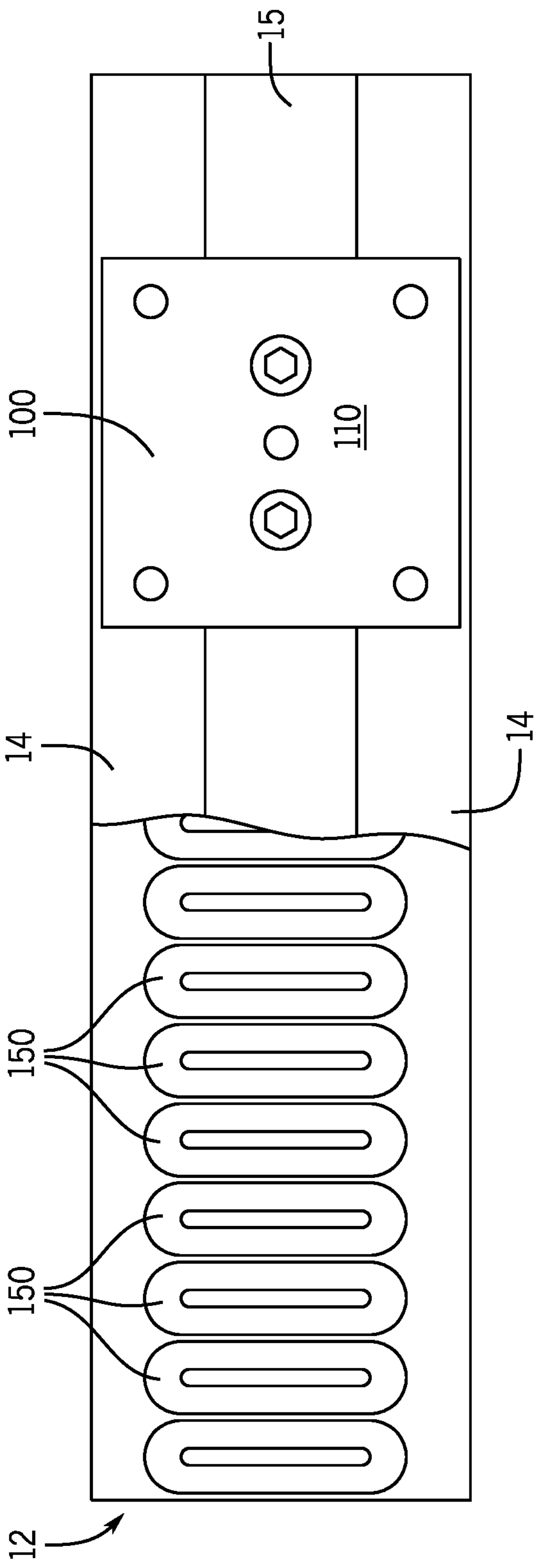
FIG. 3 is a partial top cutaway view of the mover and track segment of FIG. 1.

The mover 100 is carried along the track 10 by a linear drive system. The linear drive system is incorporated in part on each mover 100 and in part within each track segment 12. A first portion of the linear drive system includes one or more drive magnets 130 mounted to each mover 100. With reference to FIG. 2, the drive magnets 130 are arranged in a block on the lower surface of each mover 100. The linear drive system further includes a series of coils 150 spaced along the length of the track segment 12. With reference also to FIG. 3, the coils 150 may be positioned within a housing for the lower portion 19 of the track segment 12 and below the surface of the channel 15. The coils 150 are energized sequentially according to the configuration of the drive magnets 130 present on the movers 100. The sequential energization of the coils 150 generates a moving electromagnetic field that interacts with the magnetic field of the drive magnets 130 to propel each mover 100 along the track segment 12.

A segment controller 50 is provided within each track segment 12 to control the linear drive system and to achieve the desired motion of each mover 100 along the track segment 12. The segment controller 50 for each track segment 12 regulates current in the coils 150 to generate an electromagnetic field. Further, the segment controller 50 selectively energizes coils 150 along a length of the track segment 12 to create a moving electromagnetic field. This moving electromagnetic field interacts with the magnetic field generated by the drive magnets 130 on each mover 100 to cause the movers 100 to travel along the track segment. Regulating the current such that the electromagnetic field moves along the track segment 12 in a first direction causes the mover 100 to travel in the first direction, and regulating the current such that the electromagnetic field moves along the track segment 12 in the opposite direction causes the mover 100 to travel in the opposite direction.

Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a node controller 170 which is, in turn, in communication with an industrial controller 200. The exemplary industrial controller 200 includes: a power supply 202 with a power cable 204 connected, for example, to a utility power supply; a communication module 206 connected by a network medium 160 to the node controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a node controller 170 where the node controller 170 operates to generate commands for each segment controller 50.

A position feedback system provides knowledge of the location of each mover 100 along the length of the track segment 12 to the segment controller 50. According to one embodiment of the invention, the position feedback system includes one or more position magnets mounted to the mover 100. According to another embodiment of the invention, the position feedback system utilizes the drive magnets 130 as position magnets. Position sensors 145 are positioned along the track segment 12 at a location suitable to detect the magnetic field generated by the drive magnets 130. According to the illustrated embodiment, the position sensors 145 are located below or interspersed with the coils 150. The sensors 145 are positioned such that each of the drive magnets 130 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The position sensors 145 are spaced apart along the length of the track. According to one aspect of the invention, the position sensors 145 are spaced apart such that adjacent position sensors 145 generate a feedback signal which is offset from each other by ninety electrical degrees (90°). Multiple position sensors 145 are, therefore, generating feedback signals in tandem for a single mover 100 as the mover is travelling along the track 10.

Each controller (i.e., the segment controller 50, the node controller 170, and the industrial controller 200) includes at least one processor and non-transitory memory. The non-transitory memory stores instructions for execution by the processor within the controller. It is contemplated that the processor and non-transitory memory may each be a single electronic device or formed from multiple devices. The processor may be a microprocessor. Optionally, the processor and/or the non-transitory memory may be integrated on a field programmable gate array (FPGA) or an application specific integrated circuit (ASIC). The instructions include one or modules, control programs, and/or an operating system to achieve the desired functions of the corresponding controller. Although certain features of the present invention are discussed herein as being performed by specific controllers, in alternate embodiments, some features may be performed by another controller within the system.

The exemplary industrial controller 200 may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100.

According to the illustrated embodiment, a delta robot 220 is located proximate to the independent cart system. The delta robot 220 includes multiple arms 222 connected to universal joints at a base 224. Further, the base 224 may include a tool 226 or may be configured to selectively receive a variety of tools 226 for interaction with a payload present on one of the movers 100. The arms 222 are controlled in tandem to achieve a desired position and orientation of the base 224. Alternately, the arms 222 may be controlled to achieve a desired location and/or orientation of the tip 228 of the tool 226 with respect to a payload present on the mover 100.

An external controller 230 may be provided to control operation of the robot 220. The illustrated controller 230 is a computer including a processing unit 232 as well as a monitor 234 and a keyboard 236 for user interface. It is contemplated that the controller 230 may be an industrial computer, a laptop computer, or still other processing devices configured to control operation of the robot 220.

Typically, the external controller 230 generates complex motion commands for each axis of the robot 220. The complex motion commands may include a desired trajectory for the tool tip in a three-dimensional Cartesian coordinate system. Optionally, the trajectory may further include rotational commands, defining orientation of the tool tip in addition to a positional location within the coordinate system. The trajectory may be converted to separate motion commands along each lateral and rotational axis and/or converted to motion commands for each arm 222 of the robot 220. The external controller 230 is in communication with the industrial controller 200 via the industrial network. As illustrated, a network switching device 240 is provided between the external controller 230 and the industrial controller with network media 160 connecting each controller to the switching device.

Each arm 222 has a motor drive 225 to control operation of the corresponding arm. The motor drives 225 are also connected to the network switching device 240 via network media 160. It is contemplated that the motor drives 225 may receive motion commands directly from the external controller 230 to achieve desired operation of the robot. Optionally, the motion commands are transmitted from the external controller 230 to the industrial controller 200. The industrial controller 200 may pass the motion commands directly to the motor drives 225 or first perform additional processing on or coordination with other devices in the controlled system prior to passing motion commands to the motor drives 225. For example, motion of the robot 220 may be coordinated with motion of the movers 100 in the independent cart system.

In operation, the exemplary independent cart system disclosed herein may be operated, in part, with a distributed control structure and, in part, with a central control structure. Under the distributed control structure, the node controller 170 and/or the segment controller 50 receives a command corresponding to a desired position along the track 10 for one of the movers 100 in the independent cart system. If the desired position is received at the node controller 170, the node controller may either pass the desired position directly to the segment controller 50 on which the mover 100 is located or, optionally, the node controller 170 may generate a motion trajectory corresponding to the desired motion for the mover 100 and transmit the motion trajectory to the segment controller 50. According to another aspect of the invention, the segment controller 50 receives the desired position and generates the motion trajectory for the mover 100 present on the corresponding track segment 12.

The motion trajectory for the mover 100 is a function of a desired velocity, acceleration, and/or jerk at which the mover 100 is to be controlled. Under a distributed control structure, the mover 100 may include a mover datasheet that follows the mover 100 and is transmitted between segment controllers 50 as a mover 100 travels along the corresponding track segments 12. The mover datasheet includes information such as a maximum velocity, acceleration, and/or jerk rate permitted for the mover 100. The datasheet may also include a desired velocity, acceleration, and/or jerk rate for the mover 100. This desired velocity, acceleration, and/or jerk rate may change as a function of a payload present on the mover 100 or the location of the mover along the track 10. The desired velocity, acceleration, and/or jerk rate may be dynamically adjusted as a payload is added or removed from the mover 100. Each segment controller 50 may store the datasheet within memory for the corresponding segment controller 50 while the mover 100 is present on the corresponding track segment 12, and the datasheet may be removed from memory when the mover 100 is transferred to an adjacent track segment 12. These operating parameters, as well as a desired position of the mover 100 are used to determine command values for the motion trajectory as a mover 100 is controlled on the corresponding track segment.

The segment controller 50 on which the mover 100 is presently located, uses the operating parameters as well as measured data, corresponding to the present operating conditions for the mover 100 to determine a command value for the mover 100 at a periodic interval. The frequency of the periodic interval may be, for example, in a range from two kilohertz to one hundred kilohertz. As discussed above, position sensors 145 measure the present location of the mover 100 along the track segment 12. In alternate embodiments, the sensor may provide a measured velocity or measured acceleration feedback signal. The measured signals may be compared directly to a commanded value to generate an error signal. This error signal is provided to a feedback controller which, in turn, generates a new command signal for the current periodic cycle. As a mover is ready to transition to the next track segment 12, the segment controllers 50 in the adjacent track segments communicate with each other to provide the datasheet corresponding to the mover 100 as well as the measured and commanded data on the current operating state of the mover 100. When the mover 100 transitions to the next track segment 12, the segment controller 50 for the adjacent track segment assumes responsibility for control of the mover 100. The feedback controllers in each track segment 12 utilize identical methods of feedback control as well as identical methods of motion trajectory generation. As a result, using data from one segment controller 50 in the feedback controller and motion trajectory generator for the adjacent segment controller provides a smooth transition of the mover 100 between track segments. The mover 100 is controlled by segment controllers 50 in successive track segments 12 until it reaches its desired location.

In contrast, under the central control structure, the industrial controller 200, external controller 230, or some other controller is responsible for generating motion trajectories for each mover 100 in the independent cart system and ensuring that each mover 100 reaches its intended destination. If the central controller is the industrial controller 200, a control program executing in the industrial controller determines when a mover 100 is required at different locations. The industrial controller may include a motion module dedicated to generating motion trajectories to be delivered to and receiving feedback information from the segment controllers 50. The motion module adapts the motion trajectories as needed based on the feedback information. In addition, the industrial controller 200, motion module, an external controller 230, or a combination thereof may be utilized to synchronize operation of the movers 100 with an external device.

Figure 5:
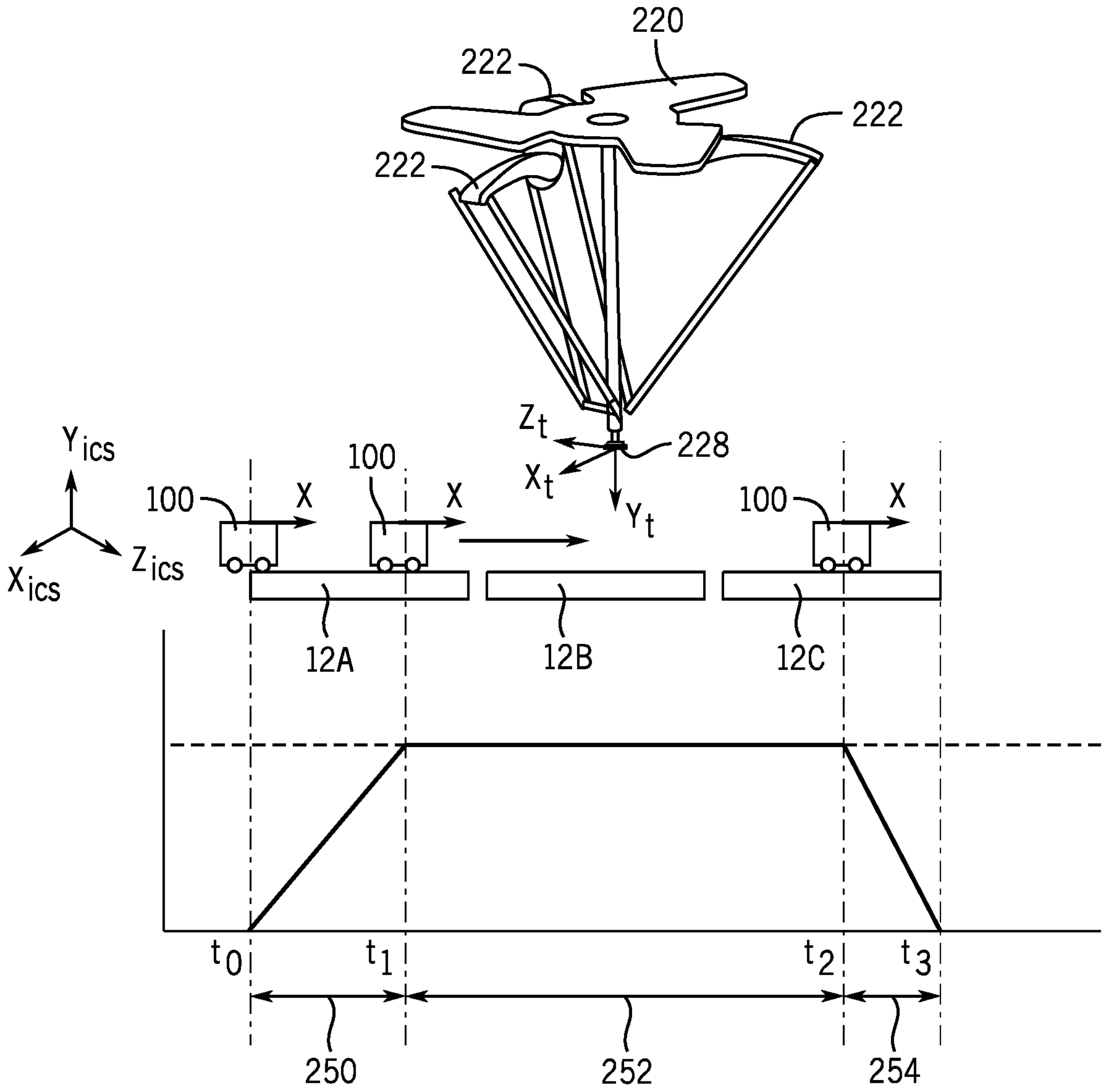
FIG. 5 is a timing diagram illustrating a transition from distributed control to centralized control and back to distributed control according to one embodiment of the invention.

With reference next to FIG. 5, certain applications may require control of the movers 100 to occur in the distributed control structure for a first portion of the independent cart system and in the central control structure for a second portion of the independent cart system. Prior to the time, to, each mover 100 is operating under distributed control. Additional track segments 12 would be present along the independent cart system prior to the robot 220, and while travelling along these additional track segments and as each mover 100 approaches the robot 220 along a first track segment 12A, the movers 100 travel under distributed control. At time, to, each mover 100 enters a first transition region 250. According to one aspect of the invention, the start of the transition region may be defined by a fixed location along the track 10. According to another aspect of the invention, the start of the transition region may be triggered by a control program executing on the industrial controller 200 indicating a mover 100 is needed to operate synchronously with the robot 220. The control program may set a synchronize bit that is used to initiate the synchronous operation. During the first transition region 250, control of the mover 100 switches from distributed control to centralized control.

At time, $t_1$, control of the mover 100 is performed under centralized control. Within the centralized control region 252 motion of the mover 100 is controlled in tandem with operation of the robot 220. According to one aspect of the invention, the external controller 230 generates motion trajectories for the robot 220. The external controller 230 may also be configured to generate a motion trajectory for the mover 100 as it works in coordination with the robot 220. According to another aspect of the invention, the external controller 230 may first transmit the motion trajectories for the robot 220 to the industrial controller 200. The industrial controller, in turn, passes the motion trajectories to the motor drives 225 to control operation of the robot 220. Having received the motion trajectories for the robot 220, the industrial controller 200 may further generate a motion trajectory for the mover 100 to operate in coordination with the robot 220. In either embodiment, the mover 100 receives a motion trajectory from a central controller to permit coordinated motion with the robot 220.

At time, $t_2$, each mover 100 enters a second transition region 254. According to one aspect of the invention, the start of the transition region may be defined by a fixed location along the track 10. According to another aspect of the invention, the start of the transition region may be triggered by the control program executing on the industrial controller 200 indicating the coordinated motion of the mover 100 with the robot 220 is complete. The control program may reset the synchronize bit that was used to initiate the synchronous operation to indicate that synchronous operation is no longer required. During the second transition region 254, control of the mover 100 switches back from centralized control to distributed control. The mover 100 will then continue travelling along additional track segments 12 under the distributed control method.

Figure 4:
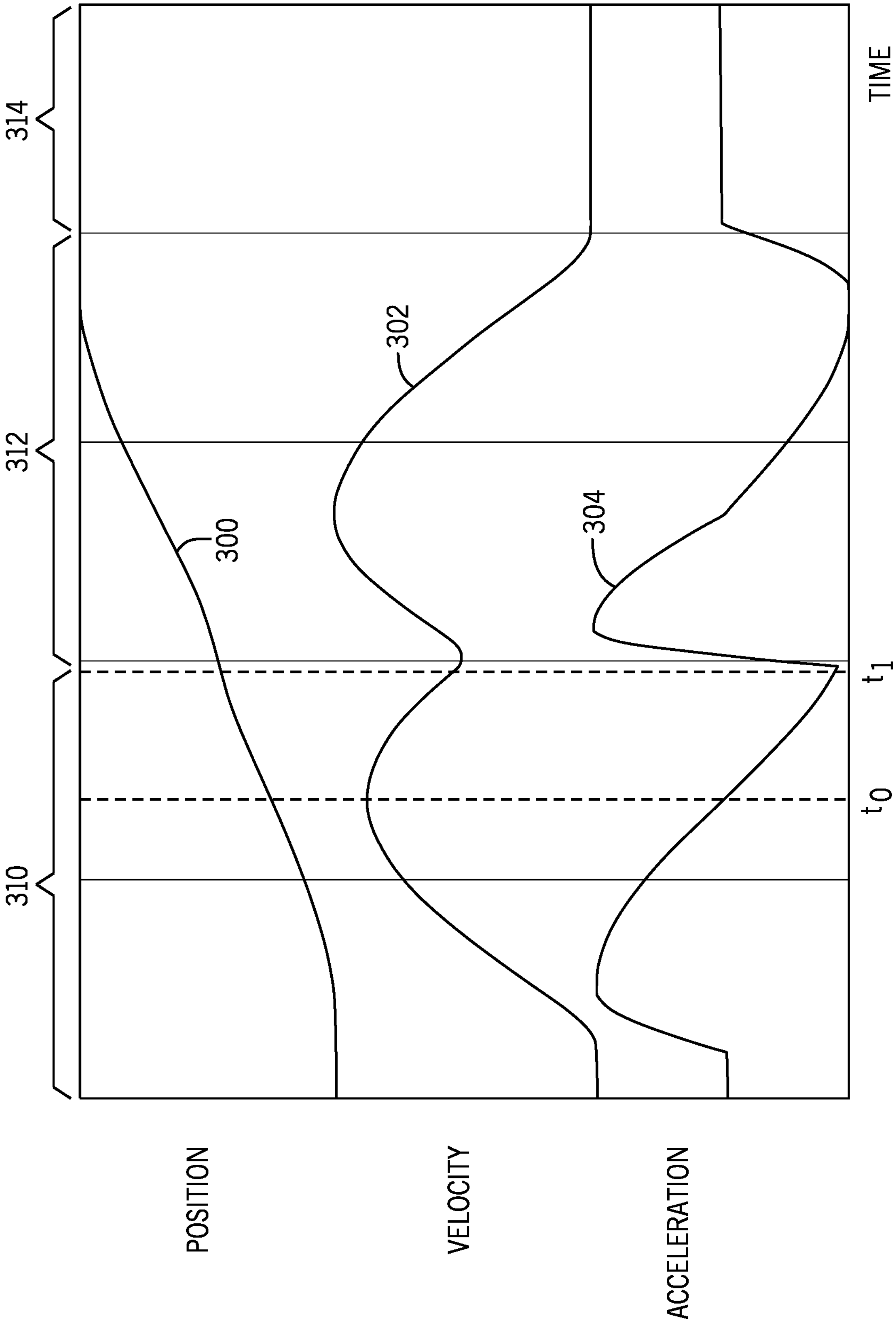
FIG. 4 is a graphical representation of the position, velocity, and acceleration of one mover as it transitions between two motion profiles according to one embodiment of the invention.

As the mover 100 transitions between distributed control and centralized control, coordination of the motion commands under each control structure provides for smooth operation of the mover 100 during the transition while the mover 100 continues travelling along the track 10. With reference to FIG. 4, a first time interval 310 corresponds to a portion of a first motion trajectory for one mover 100 in the independent cart system. The first time interval 310 may be a commanded motion trajectory for the mover 100 to follow under distributed control. During this first time interval 310 a motion trajectory requires the mover 100 to travel from a first position to a second position. The motion trajectory is, however, interrupted at time, $t_1$, before the first motion trajectory is complete. At time, $t_1$, a transition from distributed motion control to centralized motion control is required. Within the second time interval 312, a second motion trajectory is commanded for the mover 100. The example illustrated in FIG. 4 includes the position of the mover 100 shown in the first plot 300 of FIG. 4, the velocity of the mover 100 shown in the second plot 302, and the acceleration of the mover shown in the third plot 304. A smooth transition occurs between the first time interval 310 and the second time interval 312. While discussed herein as a transition between distributed and centralized control, the transition occurs between a first controller generating a first motion profile and a second controller generating a second motion profile. The transition discussed herein is equally applicable, for example, to a transition between two different centralized controllers. The first centralized controller may be, for example, the industrial controller 200 controlling operation of the independent cart system, and the second centralized controller may be the external controller 230, where the external controller may assume responsibility for controlling the movers 100 over a predefined portion of the track 10.

Figure 6:
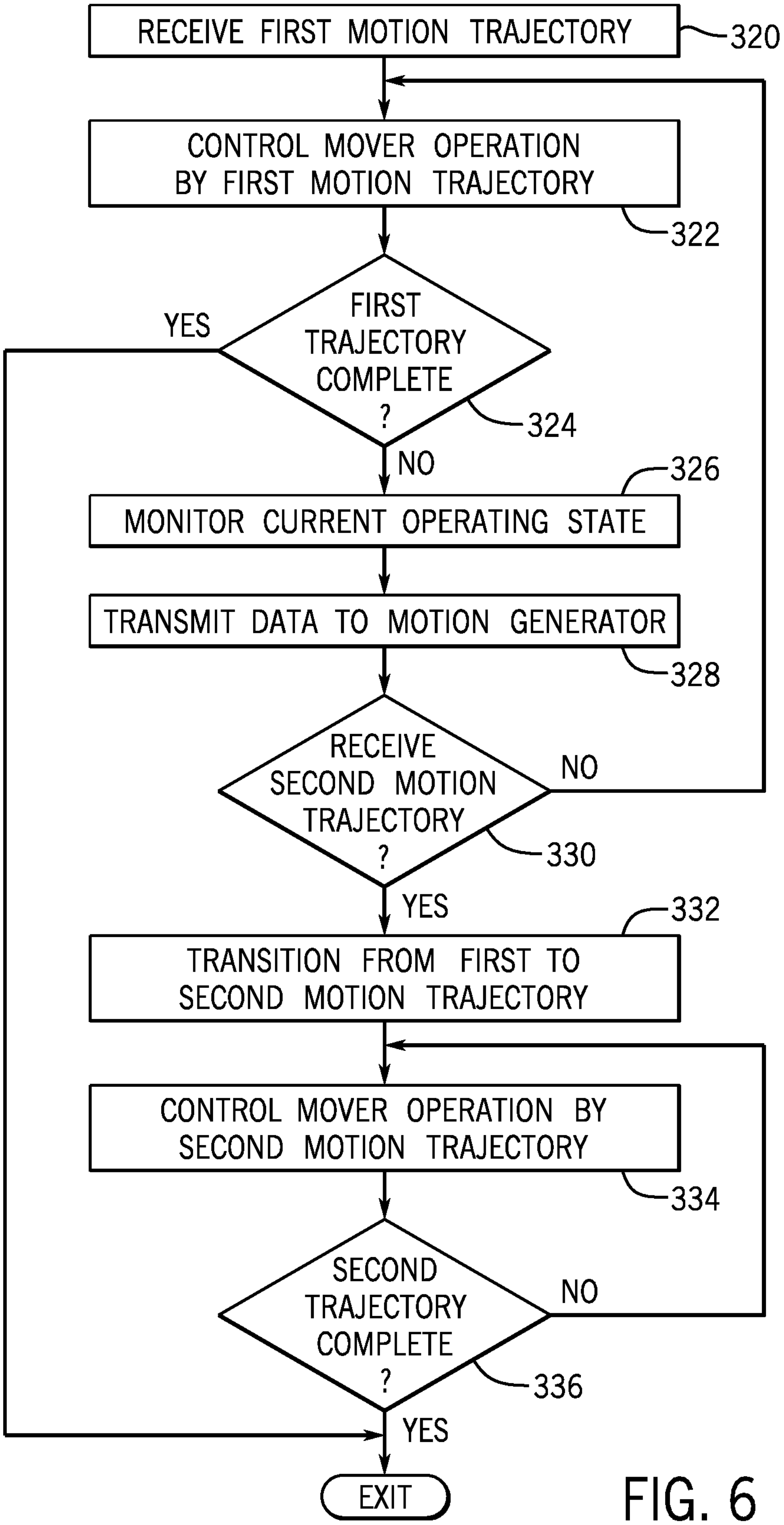
FIG. 6 is a flow diagram illustrating the steps to achieve a smooth transition between different motion profiles according to one embodiment of the invention.

Turning next to FIG. 6, the steps to achieve a smooth transition between different motion profiles according to one embodiment of the invention are illustrated. At step 320, the mover 100 is being controlled according to a first motion trajectory. The segment controller 50 receives the first motion trajectory. According to one aspect of the invention, the first motion trajectory is generated by a first controller external from the segment controller 50. According to another aspect of the invention, the segment controller 50 receives a desired position for a mover 100 present on the corresponding track segment 12, and the segment controller 50 generates the first motion trajectory. At step 322, the mover 100 is controlled according to the first motion trajectory. Whether the segment controller 50 receives a trajectory or generates the trajectory, the position, velocity, and/or current regulators executing in the segment controller 50 regulate current in the coils 150 along the track segment 12 to achieve desired operation of the mover 100 responsive to the first motion trajectory. At step 324, the segment controller 50 monitors operation of the mover 100 to see if it completes the first motion trajectory. If the first motion trajectory is completed as desired, no transition between motion trajectories is required. If, however, the first motion trajectory is interrupted by a second motion trajectory, additional steps are performed to provide for a smooth transition between motion trajectories.

At step 326, a first additional step for providing a smooth transition between motion trajectories includes monitoring the present operating state for the first motion trajectory generator. According to one aspect of the invention, the controller responsible for generating the first motion trajectory may continually monitor the present operating state for generating the motion trajectory. As previously mentioned, a motion trajectory is generated from a complex computation as a function of multiple reference and/or feedback values. The references may include a position command, a velocity command, an acceleration command, and/or a jerk command. Similarly, the feedback values may include a position feedback signal, a velocity feedback signal, an acceleration feedback signal, and/or a jerk feedback signal. The reference values calculated for a given period may further be limited by minimum or maximum settings for each of the reference variables. A discrete reference generator may utilize current values as well as values from one or more prior periods. The controller responsible for generating this first motion trajectory may continually store copies of each value utilized to generate a new reference value in the motion trajectory. Optionally, the controller may wait until a transition signal is received to store data corresponding to the current operating state of the controller. With reference again to the exemplary application shown in FIG. 5, when the mover reaches time, to, whether at a fixed position or based on a control signal, the controller begins storing the necessary values of the current operating state of the controller.

At step 328, the controller responsible for generating the first motion trajectory transmits data to the controller responsible for generating the second motion trajectory. Preferably, the first controller communicates the data when a transition between controllers is required. The required transition may be indicated based on a location of the mover 100 along the track or a signal generated by the control program executing in the industrial controller 200. Optionally, the first controller may continually communicate data between controllers, such that the second controller has continuous knowledge of the operating state for the mover 100 and for the first controller during generation of the first motion trajectory. If, for example, the segment controller 50 on which the mover 100 is located is the first controller and the external controller 230 for the robot 220 is the second controller, the segment controller 50 transmits the current operating state within the track segment 12 on which it is located to the external controller 230.

The segment controller 50 works in combination with the controllers generating the first and second motion commands to provide for a smooth transition between motion commands. At step 330, the segment controller 50 is controlling motion of the mover 100 according to the first motion trajectory and, at the same time, is monitoring for receipt of a different motion trajectory. If no additional motion trajectory is received, the segment controller 50 continues controlling operation of the mover 100 using the first motion trajectory. When a second motion trajectory is received, the segment controller 50 transitions from the first motion trajectory to the second motion trajectory, as shown in step 332.

With reference also to FIG. 4, an exemplary transition between two motion trajectories is illustrated. The first motion trajectory corresponds to the motion trajectory illustrated in the first time interval 310. According to the motion trajectory in the first time interval 310, the mover 100 was commanded to travel from a first position to a second position. The position plot 300 begins at the first position and begins to ramp upward. As seen in the velocity plot 302, the mover 100 was accelerated to a maximum speed at time, to, and then began to decelerate from the maximum speed. In many motion trajectories, the mover 100 would continue travelling at the maximum speed for some distance prior to decelerating. In other motion trajectories and as is shown in FIG. 4, the maximum speed achieved during a trajectory is not the maximum speed at which a mover 100 may travel. If a mover 100 is commanded to travel a short distance, it may only accelerate for a short duration and to a speed less than its maximum speed prior to beginning to decelerate in order to arrive at the desired position. As further seen in FIG. 4, the acceleration plot 304 indicates the mover 100 begins decelerating at time, to, as the mover 100 begins approaching its desired position. At time, $t_1$, however, the mover 100 must transition to control by the second controller. The segment controller 50 transmits the present position, the present velocity, the present acceleration, and/or the present jerk at which the mover 100 is travelling to the second controller. The segment controller 50 may also transmit measured data and/or command data for one or more prior periodic intervals from the segment controller 50.

The second controller utilizes the data received from the first controller to generate the second motion trajectory. According to the example, the external controller 230 is the second controller. The second controller 230 may be configured to control operation of the robot 220 in cooperation with the motion of the mover 100 to interact with a payload already present on the mover 100, pick an existing payload from the mover, or place a new payload on the mover. The action of the robot 220 may occur over a section of the track 10 extending from the present location of the mover to a second, final desired location of the mover. The second motion trajectory, shown over the second time interval 312, is configured to utilize acceleration rates that are quicker than the acceleration rates of the first motion trajectory. The second controller also utilizes the data received from the first controller to transition between the first and second motion commands. The present position, the present velocity, and the present acceleration of the mover 100 are used as initial values for the external controller 230, and the external controller transitions to the new motion command. As observed in the second time interval 312, the second motion command has the mover 100 travelling to a third position, where the third position is a different desired position than the second position, which was the desired ending point for the first motion command. Rather than discontinuing the first motion command and starting the second motion command, the external controller uses the known value of deceleration from the first motion command as a starting point and transitions to the desired acceleration for the second motion command. Thus, the velocity of the mover 100 continues to decelerate for a short duration, despite the second motion command contemplating a faster motion command and a move to the third position. However, allowing the velocity to continue to decelerate for a short time prior to beginning acceleration again generates a smooth transition in the velocity from deceleration to acceleration rather than having a step change between deceleration and acceleration.

The second controller may utilize different methods for blending the first and second motion commands to provide a smooth transition between the motion commands. According to one aspect of the invention, the second controller determines an acceleration command during the transition between commands using equation 1 below. The second controller also determines a velocity command during the transition between commands using equation 2 below.

$$a = \frac{(v_1^2 - v_0^2)}{2B} \quad (1)$$

where:
a=second motion trajectory acceleration,
$v_0$=mover velocity,
$v_1$=target mover velocity, and
B=length of transition.

$$v^2 = \frac{(v_1^2 - v_0^2)}{B}x \quad (2)$$

where:
v=second motion trajectory velocity,
$v_0$=mover velocity,
$v_1$=target mover velocity,
B=length of transition, and
x=second motion trajectory position.

As previously indicated, the segment controller 50 works in combination with the controllers generating the first and second motion commands to provide for a smooth transition between motion commands. According to the exemplary embodiment discussed herein, the segment controller 50 is generating the first motion trajectory under a distributed control structure. When the transition is to occur, the segment controller 50 receives a signal indicating the transition is required. The signal may be arriving at a predefined location along the track 10, a transition signal generated by the control program executing in the industrial controller 200, or simply receiving the second motion trajectory. If the segment controller 50 transitions between motion trajectories based on location or by a control signal, the segment controller 50 may transmit the present operating state to an external controller responsive to receiving the signal, and the external controller may then utilize the present operating state of the segment controller 50 as initial operating states in the second motion trajectory. Alternately, if the segment controller 50 transitions between motion trajectories responsive to receiving the new motion trajectory, the segment controller 50 may continually transmit a present operating state of the segment controller to the external controller such that the external controller may still utilize the present operating state of the segment controller 50 as the initial operating states in the new motion trajectory. Once the transition between the two motion trajectories is complete, the segment controller 50 continues controlling motion of the mover 100 responsive to the second motion trajectory, as shown in steps 334 and 336. Although the steps in FIG. 6 illustrate a transition between two motion trajectories, where the second motion trajectory completes operation, it is further contemplated, that the second motion trajectory may similarly be interpreted by still another motion trajectory. The segment controller 50 may continually monitor the present operating state of the system and monitor for a new motion trajectory to provide smooth transitions between motion trajectories generated by different controllers.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method of transitioning between motion trajectories in an independent cart system, the method comprising the steps of:
- receiving a first motion trajectory from a first controller at a segment controller for a track segment, wherein the first motion trajectory defines a first desired operation of a mover in the independent cart system and wherein the independent cart system includes a track having a plurality of track segments;
- controlling motion of the mover along the track segment with the segment controller responsive to receiving the first motion trajectory;
- transmitting at least one operating state for the first motion trajectory to an external controller as the segment controller is controlling motion of the mover responsive to the first motion trajectory;
- while the segment controller is controlling motion of the mover along the track segment responsive to the first motion trajectory, receiving a second motion trajectory from the external controller at the segment controller for the track segment, wherein the second motion trajectory defines a second desired operation of the mover and the second motion trajectory includes the at least one operating state as an initial condition for the second motion trajectory; and
- switching from the first motion trajectory to the second motion trajectory to control motion of the mover along the track segment with the segment controller as the mover continues to travel along the track segment.

2. The method of claim 1, wherein the at least one operating state includes a present position, a present velocity, and a present acceleration of the mover as it travels along the track segment.

3. The method of claim 2, wherein the at least one operating state further includes a present jerk of the mover as it travels along the track segment.

4. The method of claim 1, further comprising the steps of:
- measuring a value of either a present position or a present velocity of the mover with the segment controller for the track segment; and
- determining the at least one operating state for the first motion trajectory with the segment controller for the track segment from the value measured.

5. The method of claim 1, further comprising the step of determining the at least one operating state with the segment controller for the track segment as a function of the first motion trajectory.

6. The method of claim 1, further comprising the steps of:
- operating the segment controller in a first operating mode, wherein the first operating mode includes the steps of:
  - receiving the first motion trajectory from the first controller at the segment controller for the track segment, and
  - controlling motion of the mover along the track segment with the segment controller responsive to receiving the first motion trajectory;
- operating the segment controller in a second operating mode, wherein the second operating mode includes the steps of:
  - receiving a control signal indicating the mover is in a transition zone, and
  - transmitting the at least one operating state for the first motion trajectory to the external controller responsive to receiving the control signal; and
- operating the segment controller in a third operating mode, wherein the third operating mode includes the steps of:
  - receiving the second motion trajectory from the external controller at the segment controller for the track segment, and
  - switching from the first motion trajectory to the second motion trajectory to control motion of the mover along the track segment with the segment controller.

7. The method of claim 1, wherein the step of switching from the first motion trajectory to the second motion trajectory to control motion of the mover along the track segment with the segment controller further comprises:
- upon receiving the second motion trajectory, controlling motion of the mover according to a blended motion trajectory, wherein the blended motion trajectory is a function of the first motion trajectory and the second motion trajectory, and after controlling the motion of the mover according to the blended motion trajectory, controlling motion of the mover according to the second motion trajectory.

8. The method of claim 1, wherein:

each of the plurality of track segments includes one segment controller selected from a plurality of segment controllers;

the plurality of segment controllers in a first portion of the plurality of track segments control motion of the mover along the track in a distributed control structure responsive to the first motion trajectory; and the external controller controls motion of the mover along a second portion of the track segments in a central control structure responsive to the second motion trajectory.

9. A method of transitioning between motion trajectories in an independent cart system, the method comprising the steps of:

controlling motion of a mover along a track segment with a segment controller for the track segment responsive to a first motion trajectory;

receiving at least one operating state for the first motion trajectory at an external controller as the segment controller is controlling motion of the mover responsive to the first motion trajectory;

generating a second motion trajectory for the mover with the external controller, wherein the second motion trajectory includes the at least one operating state as an initial condition for the second motion trajectory;

transmitting the second motion trajectory from the external controller to the segment controller while the segment controller is controlling motion of the mover along the track segment responsive to the first motion trajectory; and switching from the first motion trajectory to the second motion trajectory to control motion of the mover along the track segment with the segment controller as the mover continues to travel along the track segment.

10. The method of claim 9, wherein:

the independent cart system includes a plurality of track segments defining a track;

each of the plurality of track segments includes a segment controller;

the segment controllers in a first portion of the plurality of track segments control motion of the mover along the track in a distributed control structure responsive to the first motion trajectory; and the external controller controls motion of the mover along a second portion of the track segments in a central control structure responsive to the second motion trajectory.

11. The method of claim 9, wherein the step of switching from the first motion trajectory to the second motion trajectory to control motion of the mover along the track segment with the controller further comprises:

upon receiving the second motion trajectory, controlling motion of the mover according to a blended motion trajectory, wherein the blended motion trajectory is a function of the first motion trajectory and the second motion trajectory, and after controlling the motion of the mover according to the blended motion trajectory, controlling motion of the mover according to the second motion trajectory.

12. The method of claim 9, wherein the segment controller generates the first motion trajectory.

13. The method of claim 9, wherein the at least one operating state includes a present position, a present velocity, and a present acceleration of the mover as it travels along the track segment.

14. The method of claim 13, wherein the at least one operating state further includes a present jerk of the mover as it travels along the track segment.

15. The method of claim 9, wherein the at least one operating state for the first motion trajectory is a function of either a measured speed or a measured velocity of the mover travelling along the track segment.

16. The method of claim 9, wherein the at least one operating state for the first motion trajectory is a function of a commanded value in the first motion trajectory.

17. A system for transitioning between motion trajectories in an independent cart system, the system comprising:

a track for the independent cart system, wherein the track includes:

a plurality of track segments, a segment controller in each track segment from the plurality of track segments, and a plurality of coils spaced along a length of each track segment, wherein the plurality of coils are controlled by the segment controller to sequentially generate an electromagnetic field along the length of the corresponding track segment;

a plurality of movers, wherein each of the plurality of movers includes at least one drive magnet operative to generate a magnetic field to interact with the electromagnetic field generated by the plurality of coils to move each of the plurality of movers along a corresponding track segment; and a controller operative to generate a desired motion trajectory defining a desired operation of a first mover, selected from the plurality of movers wherein:

a first segment controller, selected from the segment controllers for each of the plurality of track segments and corresponding to a track segment on which the first mover is located, initially controls motion of the first mover responsive to a first motion trajectory, the first segment controller transmits at least one operating state for the first motion trajectory to the controller as the first segment controller controls motion of the first mover responsive to the first motion trajectory, the controller includes the at least one operating state as an initial condition in the desired motion trajectory, the first segment controller receives the desired motion trajectory while controlling motion of the first mover responsive to the first motion trajectory, and the first segment controller switches from the first motion trajectory to the desired motion trajectory to control motion of the first mover as the first mover travels along the track segment.

18. The system of claim 17, wherein:

the segment controllers in a first portion of the plurality of track segments control motion of the first mover along the track in a distributed control structure responsive to the first motion trajectory; and the controller controls motion of the first mover along a second portion of the track segments in a central control structure with the desired motion trajectory.

19. The system of claim 17, wherein the step of switching from the first motion trajectory to the desired motion trajectory further includes:

controlling motion of the first mover according to a blended motion trajectory, wherein the blended motion trajectory is a function of the first motion trajectory and the desired motion trajectory, and controlling motion of the mover according to the desired motion trajectory.

* * * * *